United States Patent [19]

Wada et al.

[11] Patent Number: 5,696,567

[45] Date of Patent: *Dec. 9, 1997

[54] LIQUID CRYSTAL DISPLAY DEVICE WITH PHASE DIFFERENCE PLATE HAVING PARTICULAR ΔNXD PERPENDICULAR TO SURFACE OVER ΔNXD AT 45° ANGLE TO SURFACE

[75] Inventors: Hiroshi Wada; Hitoshi Nishizawa, both of Suwa, Japan

[73] Assignee: Seiko Epson Corporation, Tokyo, Japan

[*] Notice: The term of this patent shall not extend beyond the expiration date of Pat. Nos. 5,212,819 and 5,303,075.

[21] Appl. No.: 453,844

[22] Filed: May 30, 1995

Related U.S. Application Data

[63] Continuation of Ser. No. 226,187, Apr. 11, 1994, Pat. No. 5,426,524, which is a continuation of Ser. No. 9,848, Jan. 27, 1993, Pat. No. 5,303,075, which is a continuation-in-part of Ser. No. 683,419, Apr. 9, 1991, Pat. No. 5,212,819.

[30] Foreign Application Priority Data

| Apr. 9, 1990 | [JP] | Japan | 93667 |
| Jan. 28, 1992 | [JP] | Japan | 4-12838 |

[51] Int. Cl.⁶ ............................. G02F 1/1335
[52] U.S. Cl. ............................. 349/117
[58] Field of Search ............ 359/73, 63, 102; 349/117, 121

[56] References Cited

U.S. PATENT DOCUMENTS

| 4,844,569 | 7/1989 | Wada et al. | 359/73 |
| 4,852,976 | 8/1989 | Suzuki | 359/73 |
| 4,889,412 | 12/1989 | Clerc et al. | 359/73 |
| 4,909,606 | 3/1990 | Wada et al. | 359/73 |
| 4,957,349 | 9/1990 | Clerc et al. | 359/73 |
| 5,016,988 | 5/1991 | Iimura | 359/73 |
| 5,018,839 | 5/1991 | Yamamoto et al. | 359/73 |
| 5,119,220 | 6/1992 | Narita et al. | 359/73 |
| 5,134,507 | 7/1992 | Ishii | 359/73 |
| 5,212,819 | 5/1993 | Wada | 359/73 |
| 5,303,075 | 4/1994 | Wada et al. | 359/73 |
| 5,426,524 | 6/1995 | Wada et al. | 359/73 |

FOREIGN PATENT DOCUMENTS

| 297841 | 4/1989 | European Pat. Off. . |
| 0 350 063 | 1/1990 | European Pat. Off. . |
| 0 350 075 | 1/1990 | European Pat. Off. . |
| 0 352 724 | 1/1990 | European Pat. Off. . |
| 2580105 | 10/1986 | France . |
| 123944 | 10/1978 | Japan . |
| 1-124 822 | 5/1989 | Japan . |

OTHER PUBLICATIONS

Ohgawara et al., "A Color STN Display With Two Retardation Compensating Films", 1989 SID International Symposium, Digest of Technical Papers, First Edition, May, 1989, pp. 390–392.

CRC Handbook of Chemistry and Physics, 55th Edition, 1974, p. B-5.

Primary Examiner—Anita Pellman Gross
Attorney, Agent, or Firm—Stroock & Stroock & Lavan LLP

[57] ABSTRACT

A liquid crystal display device having a phase difference plate and a reflector, which is capable of providing a bright display. When the value of the ratio K of the product $\Delta n_1 \cdot d_1$, where $\Delta n_1$ is the optical anisotropy and $d_1$ is the thickness in the vertical direction of the phase difference plate to the product $\Delta n_2 \cdot d_2$, where $\Delta n_2$ is the optical anisotropy and $d_2$ is the thickness of the phase difference plate when inclined at 45° from the vertical direction of the phase difference plate in the direction of the optical axis, is in the range of $K \geq 1.20$, the optical axis of the phase difference plate is disposed at an angle in the range of from about +30° to about +60° or in the range of from about −30° to about −60° with respect to the direction of observation, where the values of angles are positive when measured clockwise from the observation direction, whereas, when $K < 1.20$, the optical axis of the phase difference plate is disposed at an angle in the range of from about +30° to +120° with respect to the observation direction.

8 Claims, 12 Drawing Sheets

DIRECTION OF INCIDENT LIGHT (DEGREE)

DIRECTION OF INCIDENT LIGHT (DEGREE)

LIQUID CRYSTAL DISPLAY DEVICE WITH PHASE DIFFERENCE PLATE HAVING PARTICULAR ΔNXD PERPENDICULAR TO SURFACE OVER ΔNXD AT 45° ANGLE TO SURFACE

This is a continuation of U.S. patent application Ser. No. 08/226,187 filed Apr. 11, 1994, now U.S. Pat. No. 5,426,524, which is a continuation of U.S. patent application Ser. No. 08/009,848 filed Jan. 27, 1993, now U.S. Pat. No. 5,303,075, which is a continuation-in-part of U.S. patent application No. 07/683,419 filed Apr. 9, 1991, now U.S. Pat. No. 5,212,819.

BACKGROUND OF THE INVENTION

This invention relates generally to a liquid crystal display device, and more particularly, to a liquid crystal display device having a reflector and which provides a display with improved brightness.

Super twisted nematic (STN) liquid crystal display devices including a uniaxial anisotropic member (an oriented high molecular weight polymer sheet) between the polarizers of the device have been proposed to improve the display contrast. An example of such a liquid crystal display device 10 with a uniaxial optically anisotropic member 12 is shown in FIG. 1. Device 10 includes a twisted nematic liquid crystal display cell 13 with an upper linear polarizer 11 and a lower polarizer 14 on the outer surfaces of cell 13 and optically anisotropic layer 12. Display cell 13 includes an upper substrate 15 and lower substrate 16 with transparent electrodes 17 and 18 disposed on the inner surfaces and a twisted nematic liquid crystal material 19 therebetween. A spacer 22 holds substrates 15 and 16 apart and liquid crystal material 19 therebetween. Liquid crystal material 19 is twist oriented by rubbing the interior surfaces of substrates 15 and 16. Device 10 would normally be back lit.

FIG. 2 shows the relationship between the axes of these elements. In FIG. 2, R15 and R16 designate the rubbing directions of upper substrate 15 and lower substrate 16. Angle T2 designates the direction and angle of twist of the liquid crystal molecules in material 19 from upper substrate 15 to lower substrate 16. P11 and P14 designate the directions of the axes of polarization of upper polarizer 11 and lower polarizer 14, respectfully. A line A–A' identifies the direction of observation of device 10. $\theta_{45}$ is the angle between direction of observation A–A' and rubbing direction R15 of upper substrate 15 and $\theta_{46}$ is the angle between direction of observation A–A' and rubbing direction R16 of lower substrate 16. $\theta_{45}$ and $\theta_{46}$ are approximately equal to each other. Device 10 is described in detail in applicant's U.S. Pat. No. 4,844,569, the contents of which are incorporated herein by reference.

In device 10, the retardation value of optically anisotropic member 12 and the relationship between the axes are set for use in an STN display mode in order to improve the contrast and allow for a black-and-white display. While this arrangement has improved contrast and achieved nearly a full black and white display compared to ordinary STN devices, viewing angle characteristics were not considered.

FIG. 11 is an alternative embodiment of a STN liquid crystal device including a phase difference plate between two polarizing plates to improve the contrast of the liquid crystal device, but including a reflector, rather than being intended to be back lit.

In a preferred embodiment of the instant invention, the STN liquid crystal material 145 of FIG. 11 is selected so that the liquid crystal molecules are homogeneously aligned so as to provide a helical structure having a twist angle of 180° to 270° and so that the layer of STN liquid crystal material has positive dielectric anisotropy. In FIG. 11, the STN liquid crystal material 145 is sealed between the gap defined by glass substrates 143 and 147. Upper and lower polarizing plates 141 and 148 are respectively disposed on the upper surface of the phase difference plate 142 and the lower surface of the lower glass substrate 147. Phase difference plate 142 is an optically anisotropic member. In addition reflector 149, which is formed of a high reflectance material, for example aluminum, is provided on the lower surface of lower polarizing plate 148.

In the past, because these phase difference plates are costly, the most efficient method for cutting them from stock is usually used. This most efficient cutting method is to have the direction of the optical axis of the phase difference plate to be either coincident with or perpendicular to the direction in which the device is normally viewed (observation direction) when the plate is cut from stock. As used herein, the observation direction is a direction in the plane of the display screen defined by the liquid crystal display cell formed by the substrates and liquid crystal material. The rubbing directions and the directions of the absorption axes of the set of polarizing plates are then conventionally determined by taking into consideration the colors and contrasts.

The conventional liquid crystal display devices which, utilize a phase difference plate having the optical axis coincident with or perpendicular to the direction in which the device is normally viewed, and a reflector, have an unfavorably low display brightness.

Accordingly, it is desirable to provide a liquid crystal display device with a reflector which has increased brightness by choosing the direction of the optical axis of the phase difference plate.

SUMMARY OF THE INVENTION

Generally speaking, in accordance with the invention, a liquid crystal display device including a liquid crystal display cell having a nematic liquid crystal material disposed between a pair of substrates which in turn are disposed between a pair of polarizing plates is provided. An optically anisotropic member (phase difference plate) is inserted between the liquid crystal display cell and one of the polarizing plates.

The value of the ratio K of the product $\Delta n1 \cdot d1$, where $\Delta n1$ is the optical anisotropy and d1 is the thickness in the vertical direction of the phase difference plate, to the product $\Delta n2 \cdot d2$, wherein $\Delta n2$ is the optical anisotropy and d2 is the thickness of the phase difference plate when inclined at 45° from the vertical direction of the phase difference plate in the direction of the optical axis, is set at a predetermined level, and the optical axis of the phase difference plate is disposed at a predetermined angle with respect to the observation direction, the observation direction being both in the plane of the display screen and substantially perpendicular to the rear edge thereof, the observation direction being the direction of the projection in the plane of the display screen of the direction from which a user of the display device most frequently views said display screen, the predetermined angle being chosen such that the reflectance of said display is substantially maximized.

The nematic liquid crystal layer has a positive dielectric anisotropy and is preferably retained between the substrates such that the liquid crystal molecules are homogeneously aligned so as to provide a helical structure having a twist angle of 180° to 270°.

In a preferred embodiment, when the value of K is greater than or equal to 1.20, the predetermined angle at which the optical axis of the phase difference plate is disposed with respect to the observation direction is in the range from about +30° to about +60° or in the range from about −30° to about −60°, where the values of these angles are positive when measured clockwise from the observation direction.

In another embodiment, when the value of K is less than 1.20, the predetermined angle at which the optical axis of the phase difference plate is disposed with respect to the observation direction is in the range from about +30° to about +120°, where the values of these angles are positive when measured clockwise from the observation direction.

Accordingly, it is an object of the invention to provide an improvement liquid crystal display device having improved brightness characteristics.

Another object of this invention is to provide a liquid crystal display device with an optically anisotropic member between a set of polarizers of the device and a reflector capable of providing an improved and satisfactorily bright display.

Still other objects and advantages of the invention will, in part, be obvious and will, in part, be apparent from the specification.

The invention accordingly comprises the article of manufacture possessing the features, properties and the relation of elements which will be exemplified in the article hereinafter described, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 3:
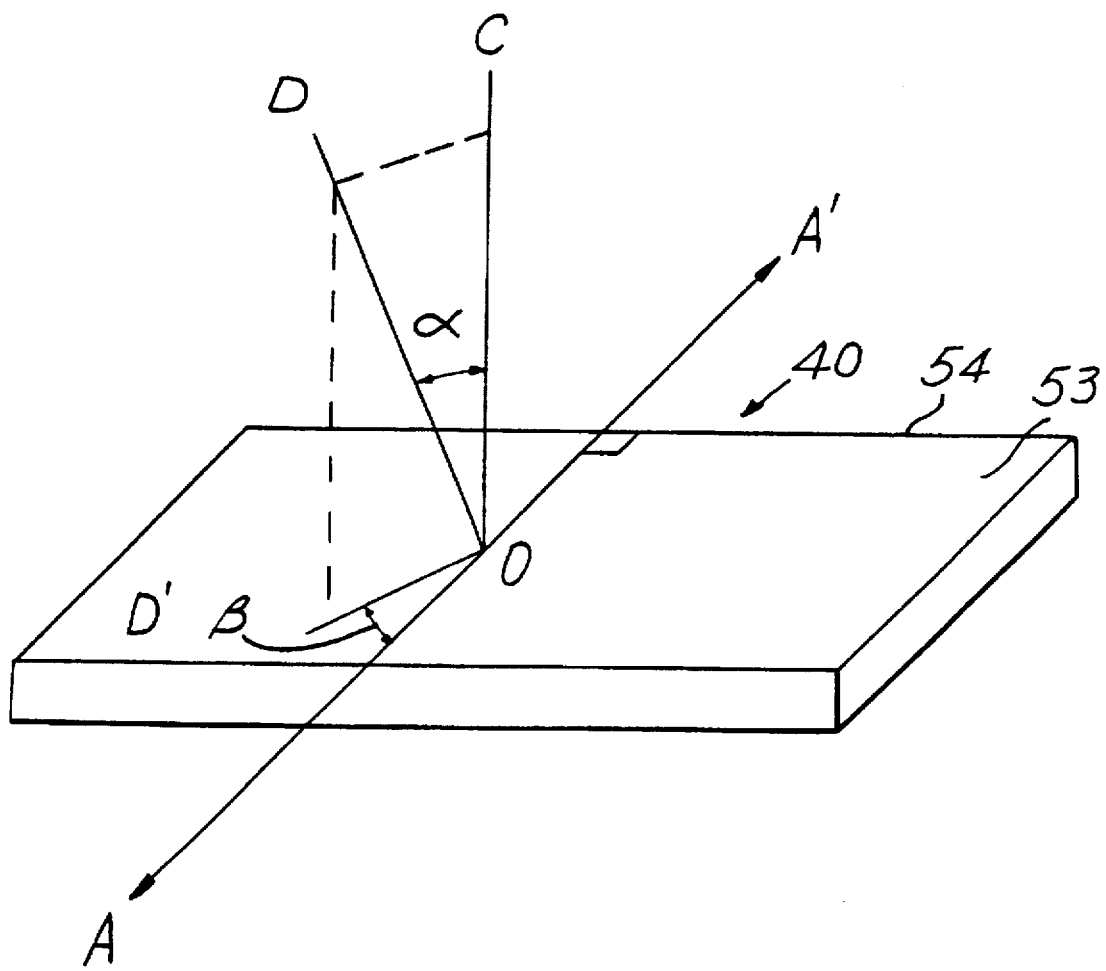
FIG. 3 diagrammatically illustrates the normal direction of observation.
Figure 12:
FIG. 12 diagrammatically illustrates the positioning of an observer with respect to a liquid crystal panel which represents the normal direction of observation.
Figure 12:
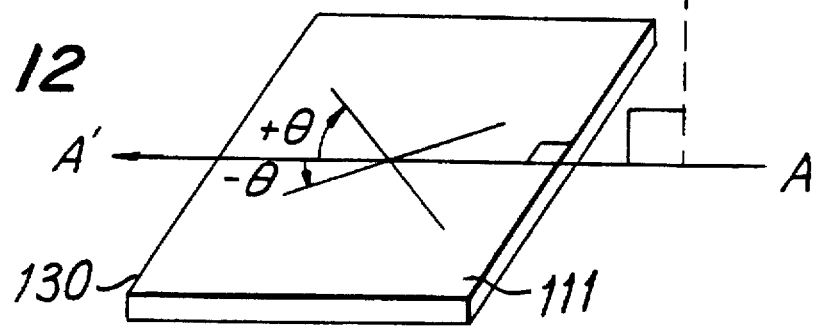

As used herein, the direction of observation is defined with reference to FIGS. 3 and 12. The direction of observation is the projection in the plane of the display screen 53 of the direction from which the display screen is viewed most frequently during use of the liquid crystal display 40. Ordinarily, it coincides with the direction A–A' perpendicular to the lengthwise direction and rear edge 54 of the rectangular display 40. In other words, the observation direction as used herein is the direction in the plane of the liquid crystal screen 53 that extends from the user to the device 40 along which a projection in said plane of the user's most frequent line of sight would lie. As used herein and as shown in FIG. 3, $\alpha$ designates the viewing angle between the direction OC perpendicular to the plane of the display screen and the direction of viewing OD, and $\beta$ designates the projected viewing angle between the direction of observation and the projected direction of viewing OD' on the plane of display screen 53.

It was desired to achieve display viewing angle characteristics such that the viewing angles on the front left side and front right side with respect to the direction of observation are approximately equal to each other, and that the ranges of viewing angles are generally uniform in the horizontal direction. An examination was made as to the effect on viewing angle characteristics of the directions of the polarization axes of the polarizing plates, the directions of axes including the rubbing directions of the liquid crystal cell, and the angles between the axes. This examination was made by using equal-contrast curves (the relationship between values of angles $\alpha$ and $\beta$ shown in FIG. 3 at which a certain contrast is obtained). It was found that the direction of the center line on which equal-contrast curves are generally symmetric approximately coincides with the direction of the optical axis of the optically anisotropic member.

To achieve improved viewing angle characteristics in the liquid crystal display device in accordance with the invention, the angle between the observation direction A–A' and the direction of the optical axis of the phase difference plate is preferably between about 0°–30° or 60°–90°.

Figure 1:
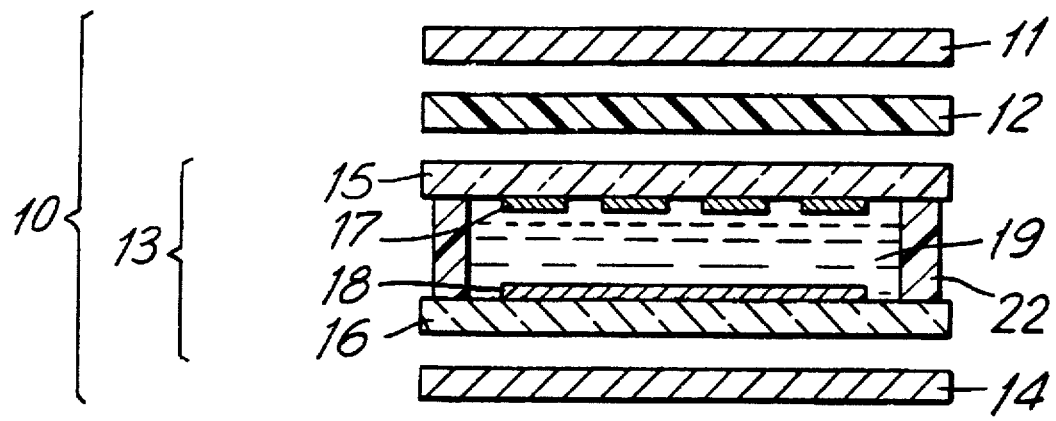
FIG. 1 is a cross-sectional view of a liquid crystal display device constructed and arranged in accordance with the prior art designed to be back lit.
Figure 4:
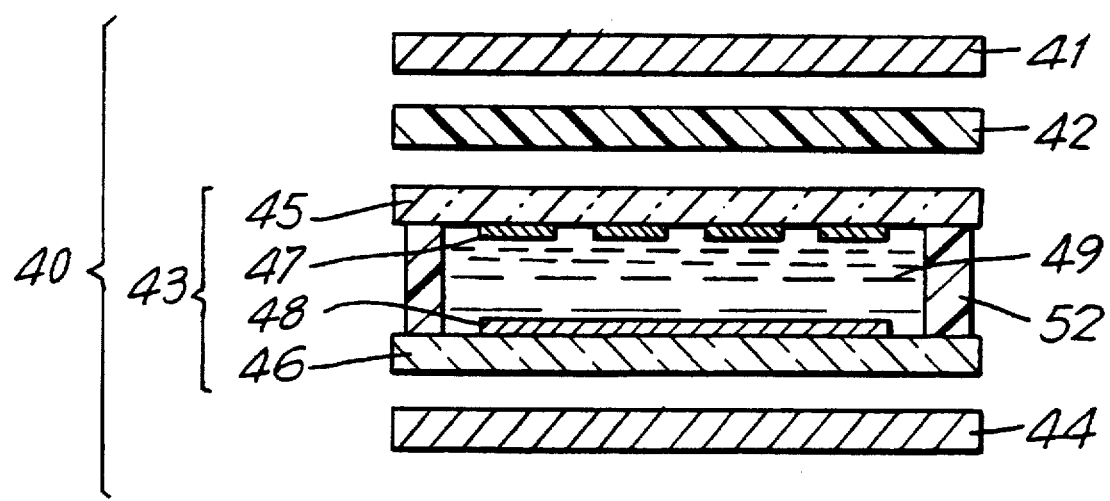
FIG. 4 is a cross-sectional view of a liquid crystal display device constructed and arranged in accordance with a first embodiment of the invention.
Figure 2:
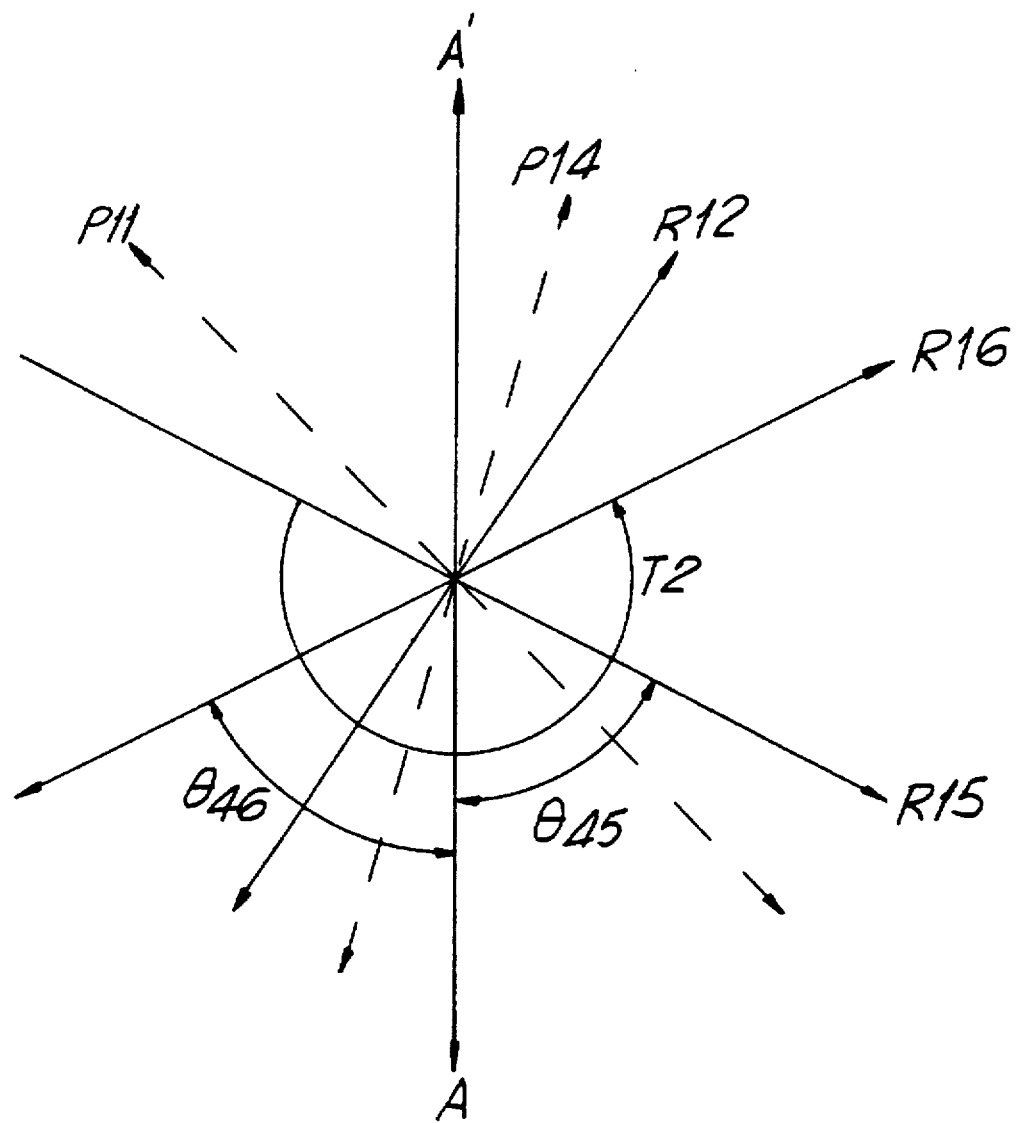
FIG. 2 diagrammatically illustrates the axes of the elements of the device of FIG. 1.

A liquid crystal display device 40 constructed and arranged in accordance with the invention is shown in FIG. 4. Device 40 includes a liquid crystal display cell 43 and a phase difference plate 42 disposed between an upper linear polarizer 41 and a lower polarizer 44. Phase difference plate 42 is a uniaxially-oriented polycarbonate member used as an optically anisotropic layer.

Phase difference plate 42 need not be limited to uniaxially-oriented polycarbonate. For instance, phase difference plate 42 may be formed by uniaxially stretching a material selected from, but not limited to, monomers or polymers of diacetyl cellulose, polyamide, polyimide, polyether sulfone, polysulfone, polyolefin, polyethylene, polyethylene terephthalate, polyvinyl alcohol, acryl, and polymethyl methacrylate.

FIG. 4 schematically shows a cross-sectional view of the structure of twisted nematic liquid crystal device 40 having a single layer 42 of an optically anisotropic substance. A liquid crystal cell 43 and layer 42 are disposed between an upper polarizer 41 and a lower polarizer 44. Cell 43 includes a twisted nematic liquid crystal material 49 disposed between an upper substrate 45 and lower substrate 46 with transparent electrodes 47 and 48 disposed on the interior surfaces, respectively.

Nematic liquid crystal material 49 is twist-oriented by rubbing the interior surfaces of substrates 45 and 46. Although liquid crystal material 49 can be oriented other than by rubbing, for convenience of description the direction in which the major axes of liquid crystal material 49 adjacent to substrates 45 and 46 will hereinafter be referred to as "rubbing direction". Spacer 52 serves to hold substrates 45 and 46 apart and retains liquid crystal material 49 in cell 43. Spacing maintaining members such as glass fibers or glass balls may be dispersed between substrates 45 and 46 to maintain the thickness of liquid crystal material 49.

Figure 5:
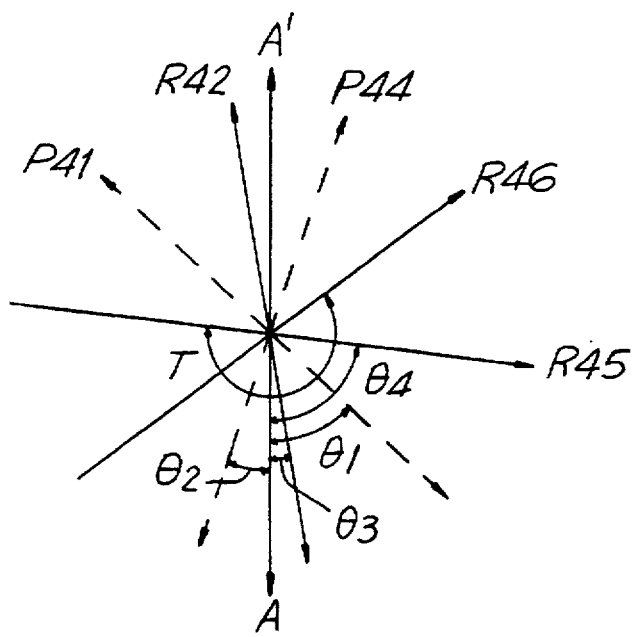
FIG. 5 diagrammatically illustrates the axes of the elements of the device of FIG. 4.

The relationship between the axes of polarizers 41 and 44, phase difference plate 42 and cell 43 are shown in FIG. 5. The rubbing directions of upper substrate 45, lower substrate 46 and phase difference plate 42 are denoted by R45, R46 and R42, respectively. The polarizing axes (absorption axes) of linear polarizers 41 and 44 are denoted by P41 and P44, respectively. Line A–A' represents the normal or usual direction of observation of device 40.

The direction and angle of twisting of liquid crystal material 49 in liquid crystal cell 43 as viewed in FIG. 4 from above to below is designated as T. $\theta_1$ is the angle between observation direction A–A' and direction P41 of the polarization axis of upper polarizing plate 41; $\theta_2$ is the angle between the observation direction A–A' and direction P44 of the polarization axis of lower polarizing plate 44; $\theta_3$ is the angle between the observation direction A–A' and the direction R42 of the optical axis of the phase difference plate 42; and $\theta_4$ is the angle between the observation direction A–A' and the rubbing direction R45 of upper substrate 45. The values of angles $\theta_1$ through $\theta_4$ are positive when measured clockwise from the observation direction A–A'.

This embodiment illustrated in FIGS. 4 and 5 will be described with respect to a negative display mode and the orientation of the polarization axes illustrated. In this mode the screen is dark when no voltage is applied and bright when a voltage is applied. However, it is observed that the same benefits of the invention can be obtained for other orientations as in a positive display mode. In this positive display mode the screen is bright when no voltage is applied, or dark when a voltage is applied. The refractive index anisotropy $\Delta n$ of phase difference plate 42 is defined as $\Delta nf$, and the thickness of plate 42 is defined as df.

Figure 6:
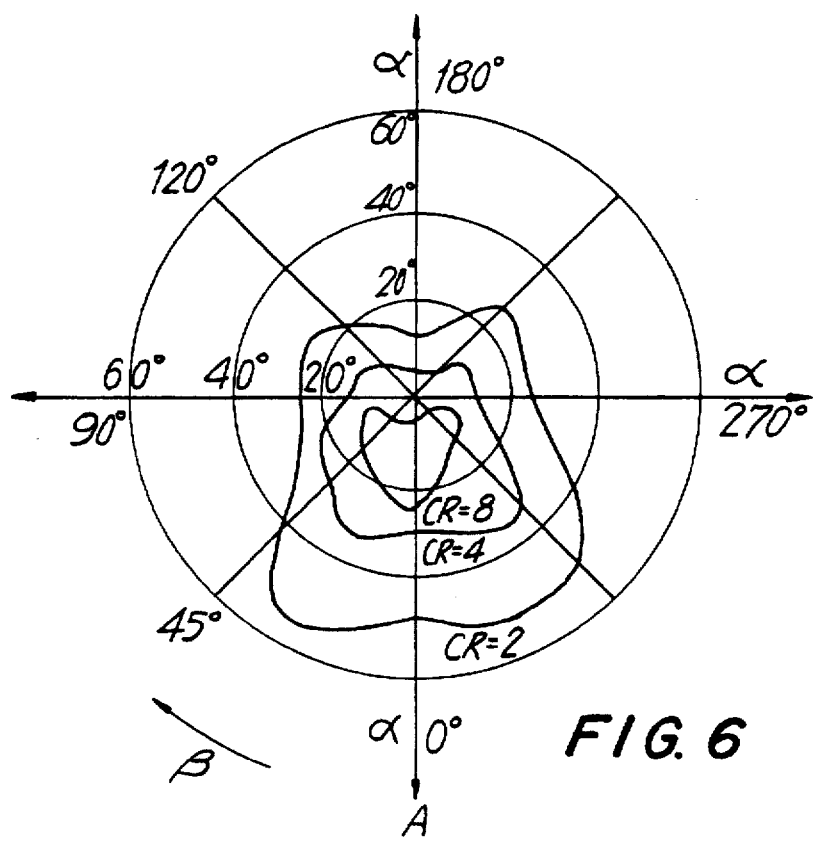
FIG. 6 diagrammatically illustrates equal contrast curves for the device of FIG. 3.

When a structure as shown in FIG. 4 has the product $\Delta n \cdot d$ of the refractive index anisotropy $\Delta n$ of liquid crystal material 49 and a liquid crystal layer thickness of 0.9 μm, liquid crystal 49 is twisted by angle T of 240°; the product $\Delta nf \cdot df$ of the refractive index anisotropy $\Delta nf$ and the thickness df of phase difference plate 42 is 0.55 μm, $\theta_1$=−45°, $\theta_2$=−15°, $\theta_3$=0° and $\theta_4$=90°. Equal-contrast curves such as those shown in FIG. 6 are obtained. These curves are symmetric with respect to normal observation direction A–A' of device 40 and device 40 is easy to view under these conditions.

The parameters defined above are set forth in Table 1, Examples 1–10 and Comparative Examples 1–3. The resulting display contrast, dependent on whether the contrast curves were generally symmetrical with respect to the direction of observation, is also set forth. The symbols ⊙, o, and x are used to indicate whether the display is very easy to see (⊙), good (o), or poor (x).

TABLE 1

| | Twisting Angle T | Δn · d of liquid crystal | Δnf · df of phase difference plate | θ1 | θ2 | θ3 | θ4 | Contrast symmetry |
|---|---|---|---|---|---|---|---|---|
| 1 | 240° left | 0.90 μm | 0.55 μm | −45° | −15° | 0° | 90° | ⊙ |
| 2 | " | " | " | −30° | 0° | 15° | −75° | ⊙ |
| 3 | " | " | " | −15° | 15° | 30° | −60° | o |
| 4 | " | " | " | −75° | −45° | −30° | 60° | o |
| 5 | " | 0.85 μm | 0.60 μm | −45° | −15° | 0° | 80° | ⊙ |
| 6 | " | " | " | −40° | −15° | 10° | 90° | ⊙ |
| 7 | " | 0.80 μm | 0.55 μm | −45° | −15° | 0° | 90° | ⊙ |
| 8 | 180° left | 0.85 μm | 0.55 μm | −45° | −40° | 0° | 90° | ⊙ |
| 9 | 230° left | 0.85 μm | 0.55 μm | −50° | −5° | 0° | 75° | ⊙ |
| 10 | " | " | " | −70° | −25° | −20° | 55° | o |
| 1 | 240° left | 0.90 μm | 0.55 μm | −10° | 20° | 35° | −55° | X |
| 2 | " | " | " | −80° | −40° | −35° | 55° | X |
| 3 | 230° left | 0.85 μm | 0.55 μm | −85° | −40° | −35° | 40° | X |

As can be seen from Table 1, when the angle between the direction of the optical axis of the phase difference plate and the direction of observation is between about 0° and 30°, a display is obtained which is easy to see and in which the contrast distribution is generally symmetric with respect to the direction of observation.

Examples 11 to 20 are display devices in which the axis of symmetry is more perpendicular to the direction of observation. The results of Examples 11 to 20, as well as Comparative Examples 4 to 6, are shown in Table 2 below. The symbols ⊙, o, and x are used to indicate whether the contrast curves are generally symmetrical with respect to a center line perpendicular to the direction of observation. ⊙ indicates that the result is very good, o indicates good, and x indicates poor.

TABLE 2

| | Twisting Angle T | Δn·d of liquid crystal | Δnf·df of phase difference plate | θ1 | θ2 | θ3 | θ4 | Contrast symmetry |
|---|---|---|---|---|---|---|---|---|
| 11 | 240° left | 0.90 μm | 0.55 μm | 45° | 75° | 90° | 0° | ⊚ |
| 12 | " | " | " | 60° | 90° | −75° | 15° | ⊚ |
| 13 | " | " | " | 75° | 15° | −60° | 30° | o |
| 14 | " | " | " | 15° | 45° | 60° | −30° | o |
| 15 | " | 0.85 μm | 0.60 μm | 45° | 75° | 90° | −10° | ⊚ |
| 16 | " | " | " | 50° | 75° | −80° | 0° | ⊚ |
| 17 | " | 0.80 μm | 0.55 μm | 45° | 75° | 90° | 0° | ⊚ |
| 18 | 180° left | 0.85 μm | 0.55 μm | 45° | −50° | 90° | 0° | ⊚ |
| 19 | 230° left | 0.85 μm | 0.55 μm | 40° | 85° | 90° | −15° | ⊚ |
| 20 | " | " | " | 20° | 75° | 70° | −35° | o |
| 4 | 240° left | 0.90 μm | 0.55 μm | 80° | −20° | −55° | −35° | X |
| 5 | " | " | " | 10° | 50° | 55° | −35° | X |
| 6 | 230° left | 0.85 μm | 0.55 μm | 5° | 40° | 55° | −50° | X |

As can be seen from Table 2, when the angle between the direction of the optical axis of the phase difference plate and the direction of observation is between about 60° and 90°, a display is obtained which is also easy to see and in which the contrast distribution is generally symmetric with respect to a line perpendicular to the direction of observation.

Figure 7:
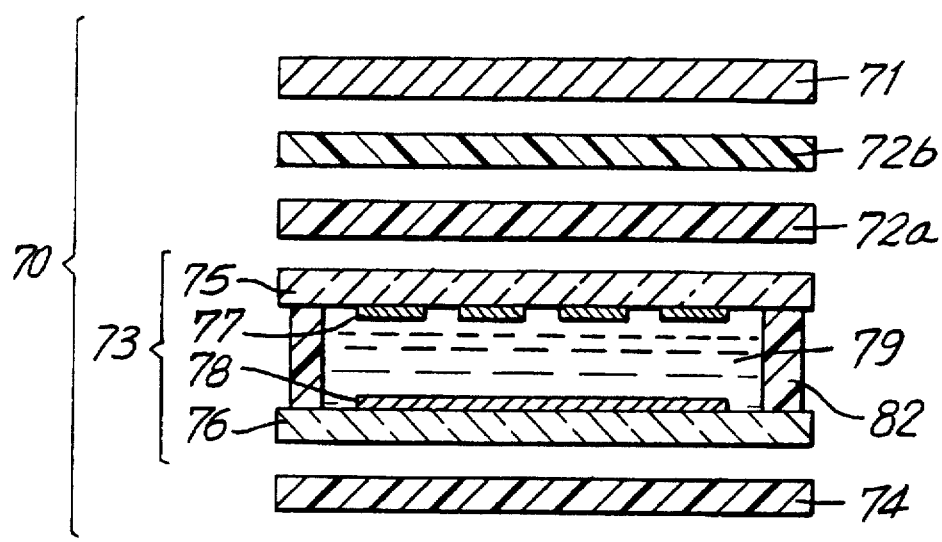
FIG. 7 is a cross-sectional view of a liquid crystal display device construed and arranged in accordance with a second embodiment of the invention.

A liquid crystal display device 70 constructed and arranged in accordance with a second embodiment of the invention is shown in FIG. 7. Device 70 includes a twisted nematic liquid crystal cell 33 and two phase difference plates 72a and 72b. Phase difference plate 72a is adjacent liquid crystal cell 73 while phase difference plate 72b is adjacent upper linear polarizer 71. Cell 73 includes a twisted nematic liquid crystal material 79 disposed between an upper substrate 75 and lower substrate 76 with transparent electrodes 77 and 78 disposed on the inner surfaces thereof. A spacer 82 holds substrates 75 and 76 apart and retains liquid crystal material 79 in the cell.

Figure 8:
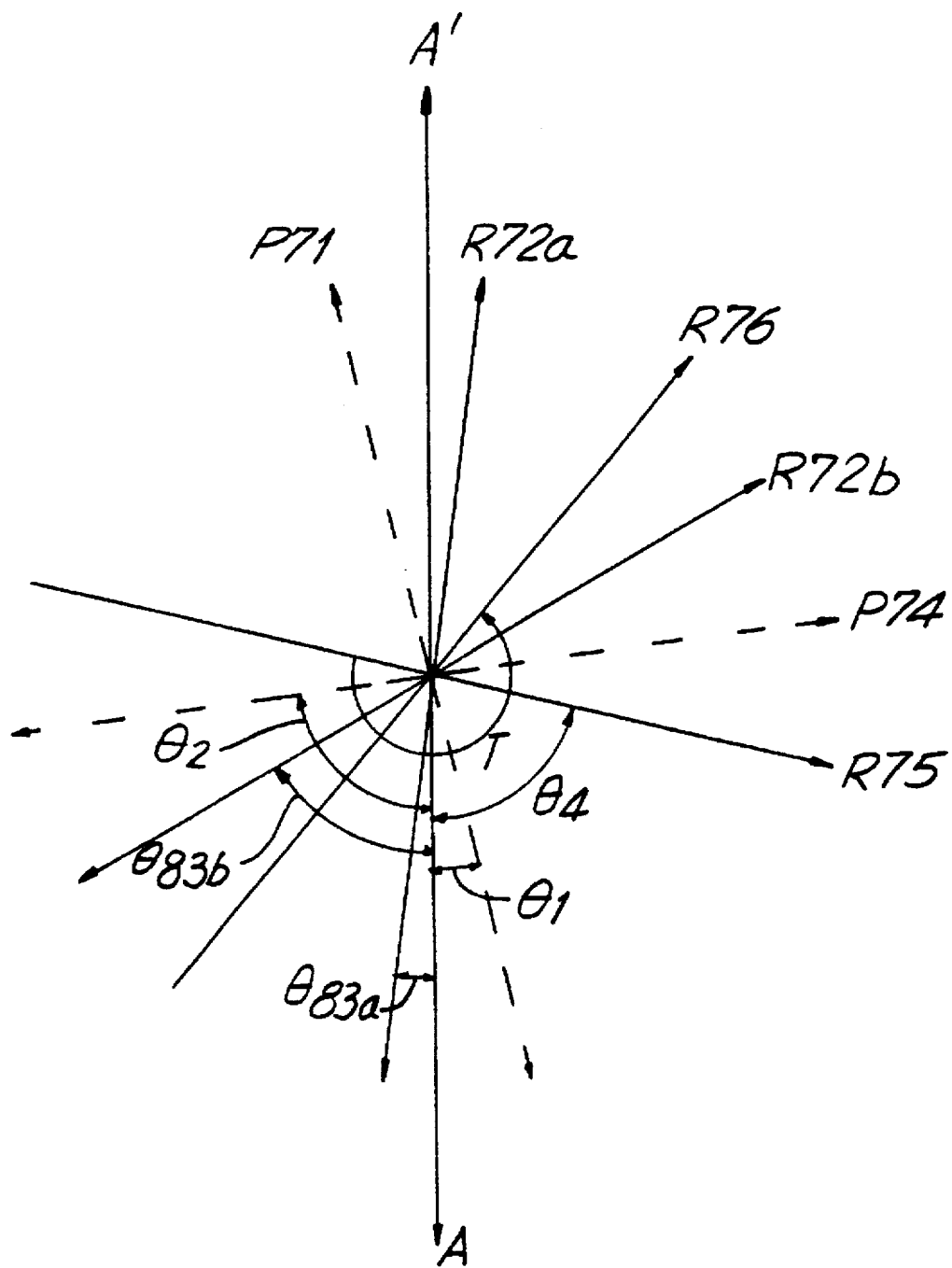
FIG. 8 diagrammatically illustrates the axes of the elements of the device of FIG. 7.

The optical relationships between the axes of polarizers 71 and 74, phase difference plates 72a and 72b, and liquid crystal cell 73 are shown in FIG. 8. The rubbing directions of upper substrate 75, lower substrate 76, and phase difference plates 72 and 72b are denoted by R75, R76, R72a and R72, respectively. The polarizing axes (absorption axes) of linear polarizers 71 and 74 are denoted by P71 and P74, respectively. Line A–A' represents the direction of observation.

The direction and angle of twisting of liquid crystal material 79 in liquid crystal cell 73 as viewed in FIG. 7 from above to below is designated as T. The angle between the observation direction A–A' and direction P71 of the polarization axis of upper polarizing plate 77 is designated as $\theta_1$. Similarly, the angle between the observation direction A–A' and direction P74 of the polarization axis of lower polarizing plate 74 is designated as $\theta_2$. The angle between the observation direction A–A' and the direction R72a of the optical axis of the phase difference plate 72a is designated $\theta_{83a}$. Similarly, the angle between the observation direction A–A' and the direction R72b of the optical axis of the phase difference plate 72b is designated 083b. The angle between the observation direction A–A' and the rubbing direction R75 of upper substrate 75 is designated as $\theta_4$.

A liquid crystal display device was assembled having the construction of device 70 with the following parameters:

1. liquid crystal material 79 has a counterclockwise twisting angle of T=240°;
2. Δn·d=0.90 μm;
3. Δnf·df for phase difference plate 72a is 0.40 μm;
4. Δnf·df for phase difference plate 72b is 0.45 μm;
5. $\theta_1$=−20°;
6. $\theta_2$=70°;
7. $\theta_{83a}$=0°;
8. $\theta_{83b}$=50°; and
9. $\theta_4$=−80°.

The parameters for Example 21 are set forth in Table 3 below, as are the parameters for a further Example 22.

TABLE 3

| | Twisting Angle T | Δn·d of liquid crystal | Δnf·df of phase difference plate 73a | Δnf·df of phase difference plate 73b | θ1 | θ2 | θ83a | θ73b | θ4 | Contrast symmetry |
|---|---|---|---|---|---|---|---|---|---|---|
| 21 | 240° left | 0.90 μm | 0.40 μm | 0.45 μm | −20° | 70° | 0° | 50° | −80° | ⊚ |
| 22 | 240° left | 0.90 μm | 0.42 μm | 0.42 μm | 0° | 90° | 30° | 70° | −70° | o |

The equal-contrast curves of Examples 21 and 22 are symmetric with respect to the direction of the liquid crystal cell, and the display is easy see under these conditions. However, the degree of symmetry of equal-contrast curves is slightly lower in Example 22 than in Example 21.

Figure 9:
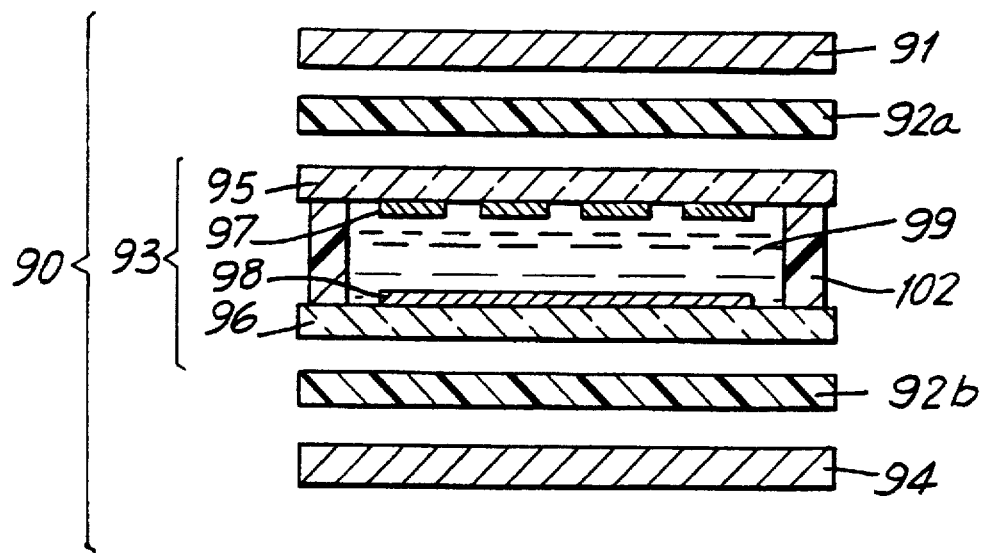
FIG. 9 is a cross-sectional view of a liquid crystal display device constructed and arranged in accordance with a third embodiment of the invention.

A liquid crystal display device 90 constructed and arranged in accordance with a third embodiment of the invention is shown in FIG. 9. Device 90 includes twisted nematic liquid crystal cell 93 disposed between two phase difference plates 92a and 92b. Phase difference plate 92a is between liquid crystal cell 93 and upper linear polarizer 91 and phase difference plate 92b is between liquid crystal cell 93 and lower linear polarizer 94. Cell 93 includes a twisted nematic liquid crystal material 99 disposed between an upper substrate 95 and lower substrate 96 with transparent electrodes 97 and 98 disposed on the inner surfaces thereof. Spacer 102 holds substrates 95 and 96 apart and retains liquid crystal material 99 therebetween.

Figure 10:
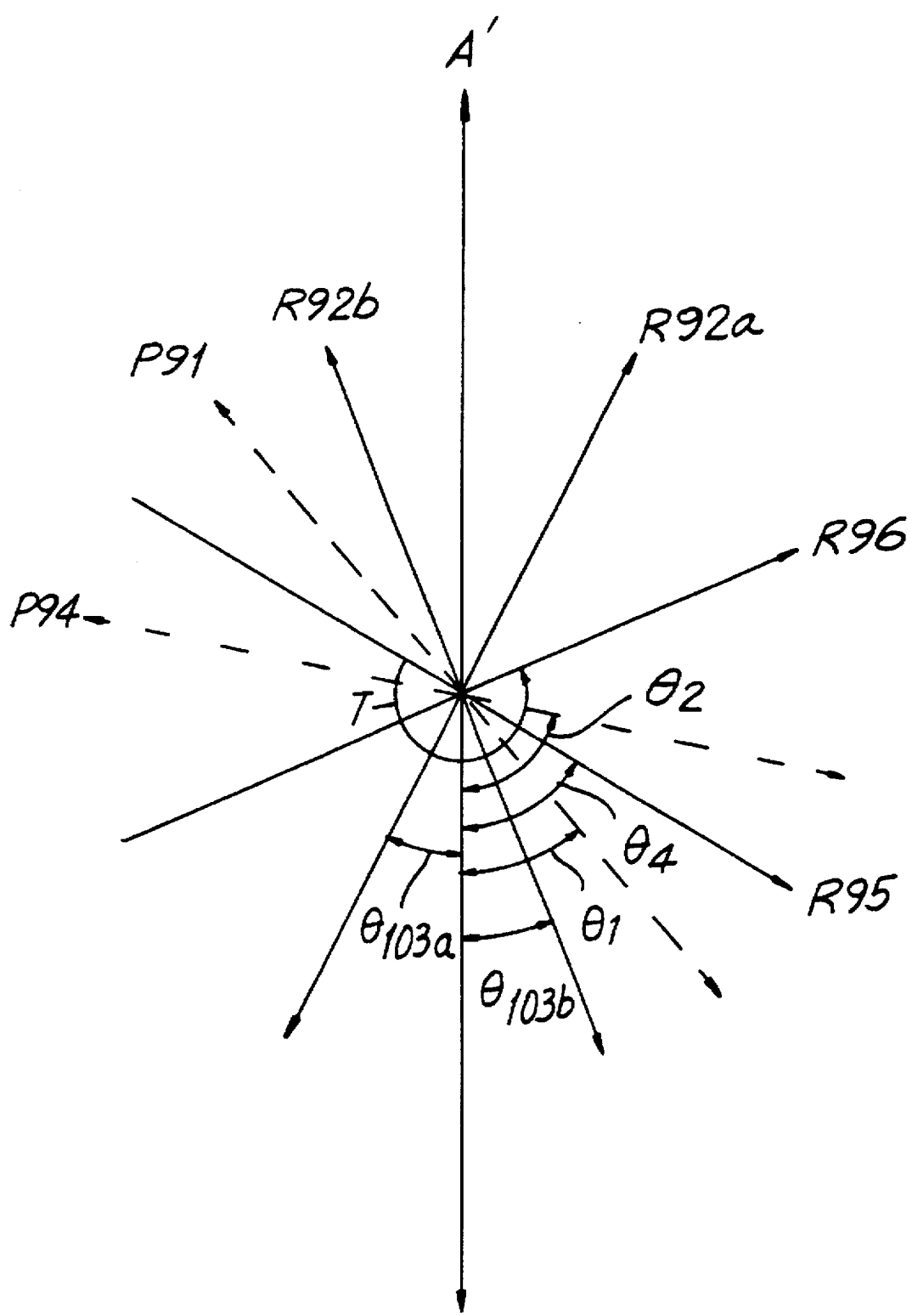
FIG. 10 diagrammatically illustrates the axes of the elements of the device of FIG. 9.

The optical relationships of the axes of polarizers 91 and 94, phase difference plates 92a and 92b, and cell 93 are shown in FIG. 10. The rubbing directions of upper substrate 95, lower substrate 96, and phase difference plates 92 and 92b are denoted by R95, R96, R92a and R92, respectively. The polarizing axes (absorption axes) of linear polarizers 91 and 94 are denoted by P91 and P94, respectively. Line A–A'represents the direction of observation.

The direction and angle of twisting of liquid crystal material 99 in liquid crystal cell 93 as viewed in FIG. 9 from above to below is designated as T. $\theta_1$ is the angle between observation direction A–A' and direction P91 of the polarization axis of upper polarizing plate 91. Similarly, $\theta_2$ is the angle between observation direction A–A' and direction P94 of the polarization axis of lower polarizing plate 94. $\theta_{103a}$ is the angle between observation direction A–A' and the direction R92a of the optical axis of the phase difference plate 92a. Similarly, $\theta_{103b}$ is the angle between observation direction A–A' and direction R92b of the optical axis of phase difference plate 92b. $\theta_4$ is the angle between observation direction A–A' and the rubbing direction R95 of upper substrate 95.

A liquid crystal display device having the construction of device 90 was assembled with the following parameters:

1. liquid crystal material 99 has a counterclockwise twisting angle of T=240°;
2. Δn·d=0.90 μm;
3. Δnf·df of phase difference plate 92a is 0.42 μm;
4. Δnf·df of phase difference plate 92b is 0.42 μm;
5. $\theta_1$=−10°;
6. $\theta_2$=−80°;
7. $\theta_{103a}$=30°;
8. $\theta_{103b}$=−30°; and
9. $\theta_4$=−60°.

The parameters defined above for Example 23 are set forth in Table 4 below, as are the parameters for a further Example 24.

crystal display device is obtained which has improved viewing angle characteristics as well as excellent black and white hues in the display.

Figure 11:
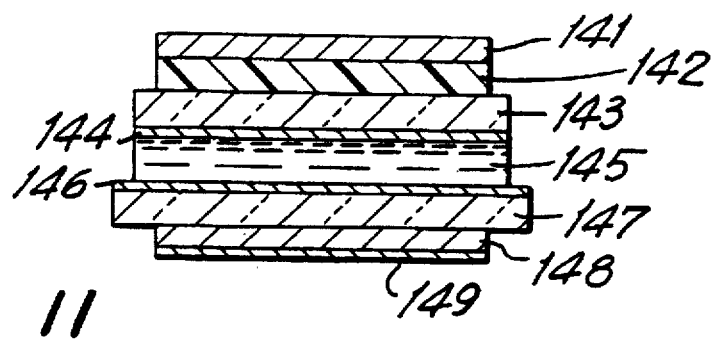
FIG. 11 is a cross-sectional view of a liquid crystal display device constructed and arranged in accordance with the prior art wherein a reflector is provided.

In an alternative embodiment, it was desired to achieve a satisfactorily bright display in a liquid crystal display device which includes a phase difference plate for color compensation and a reflector. In the use of a liquid crystal display device having a reflector, it is common for the observer to set the brightest light source in the observation direction and the desired result is a display device producing a maximum reflectance under these conditions. Thus, an examination was made as to the effect on reflectance when the optical axis of the phase difference plate was varied yet the absorption axis of the upper and lower polarizing plates remained constant. A liquid crystal display device of the type shown in FIG. 11 was used. FIG. 12 illustrates the observation direction A–A'. The observation direction as used herein is the direction in the plane of the display screen 111 of the liquid crystal panel 130 that extends from the user 113 to the panel 130 along which a projection in said plane of the user's most frequent line of sight would lie. The angles +θ and −θ refer to the angle between the optical axis of the phase difference plate and the observation direction. Specifically, when referring to an angle between the optical axis of the phase difference plate and the observation direction as a positive angle, it is directed in a clockwise direction from the observation direction. Alternatively, a negative angle is directed in a counterclockwise direction from the observation direction.

Figure 13:
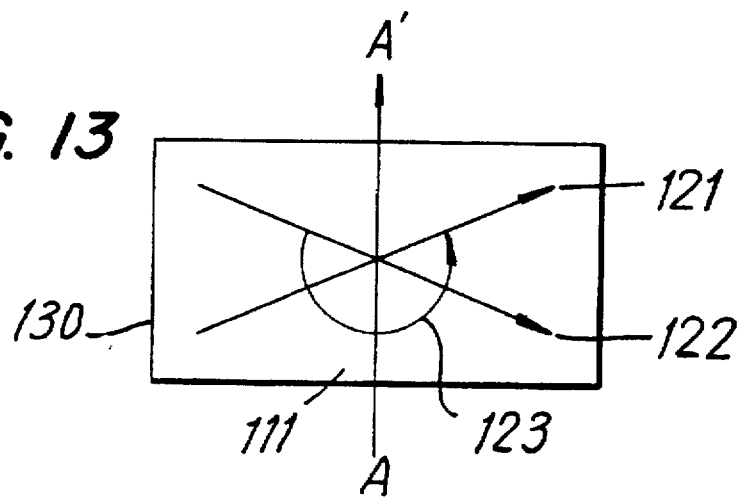
FIG. 13 diagrammatically illustrates the rubbing directions of the liquid crystal panel in a preferred embodiment of the present invention.

FIG. 13 shows the respective rubbing directions 121 and 122 of the two substrates of the liquid crystal panel 130 and the twist angle 123 of the liquid crystal molecules in the plane of display screen 111.

Figure 14:
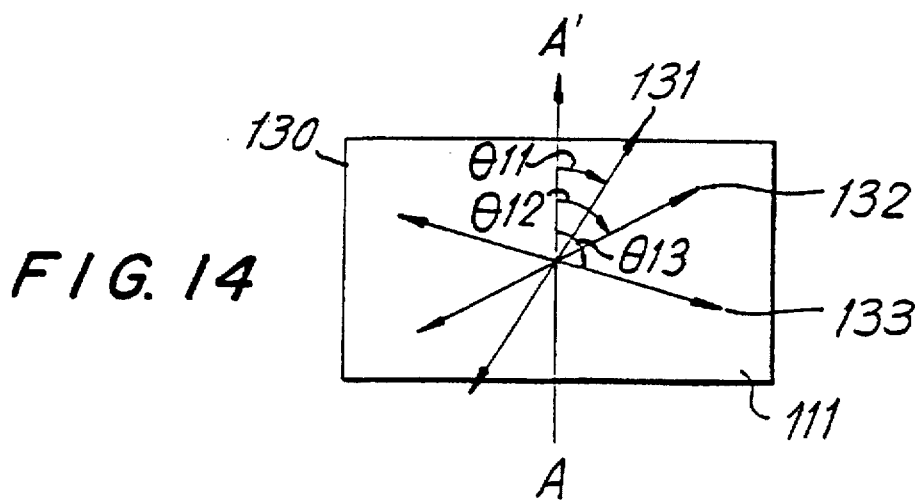
FIG. 14 diagrammatically illustrates the axes of the elements of the device of FIG. 11.

FIG. 14 shows the relationship between the direction 131 of the absorption axis of an upper polarizing plate 141, the direction 132 of the absorption axis of a lower polarizing plate 148 and the direction of the optical axis 133 of a phase difference plate 142 relative to the observation direction A–A' of the liquid crystal panel 130 in the plane of the display screen 111. θ11, θ12 and θ13 are, respectively, the angles between each of directions 131 and 132 and optical axis 133, relative to the direction A–A'.

TABLE 4

| | Twisting Angle T | Δn·d of liquid crystal | Δnf·df of phase difference plate 73a | Δnf·df of phase difference plate 73b | θ1 | θ2 | θ83a | θ83b | θ4 | Contrast symmetry |
|---|---|---|---|---|---|---|---|---|---|---|
| 23 | 240° left | 0.90 μm | 0.42 μm | 0.42 μm | −10° | −80° | 30° | −30° | −60° | ◉ |
| 24 | 260° left | 0.85 μm | 0.40 μm | 0.40 μm | 0° | 90° | 40° | −40° | −50° | ◉ |

The equal-contrast curves of Examples 21 and 22 are symmetric with respect to the direction of the liquid crystal cell, and the display is easily viewed under these conditions.

Figure 15:
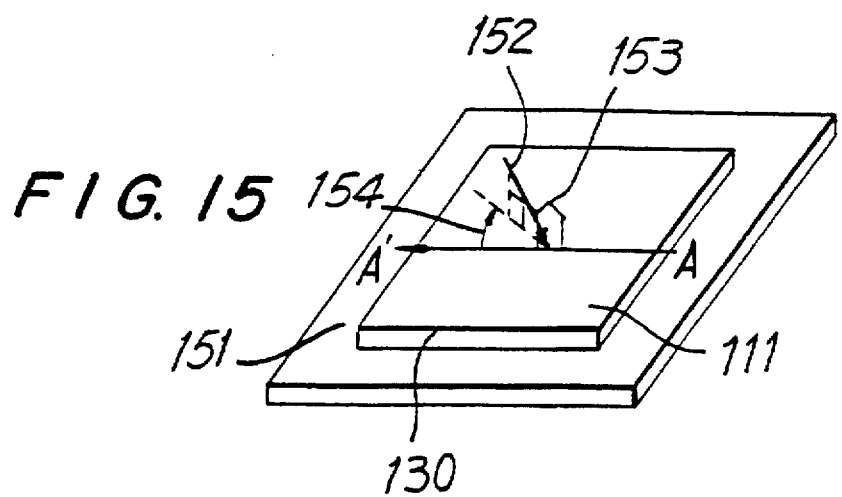
FIG. 15 diagrammatically illustrates the method of measuring the reflectance in the embodiment of the present invention.

From the Examples, it can be seen that improved viewing angle characteristics in the liquid crystal display device are obtained in accordance with the invention when the direction of the optical axis of the phase difference plate is angled to the observation direction, preferably between about 0°–30° or 60°–90°. This is true whether one or two phase difference plates are placed between the liquid crystal cell and the upper polarizing plate, or if one phase difference plate is placed between the liquid crystal cell and the upper polarizing plate and another between the liquid crystal cell and the lower polarizing plate. In this manner, a liquid FIG. 15 shows the method of carrying out the experiments that led to the present invention. Specifically, panel 130 was placed on the measuring table 151, incident light 152 was applied to display screen 111 at a certain angle from above the panel and the reflectance of the reflected light 153 was measured. A standard white card was employed to obtain a standard reflectance. The display screen 111 was then rotated horizontally to investigate the relationship between the angle 154 formed on display screen 111 between the observation direction A–A' and the projection of the direction of incident light 152 on the display screen 111 versus the reflectance.

Figure 22:
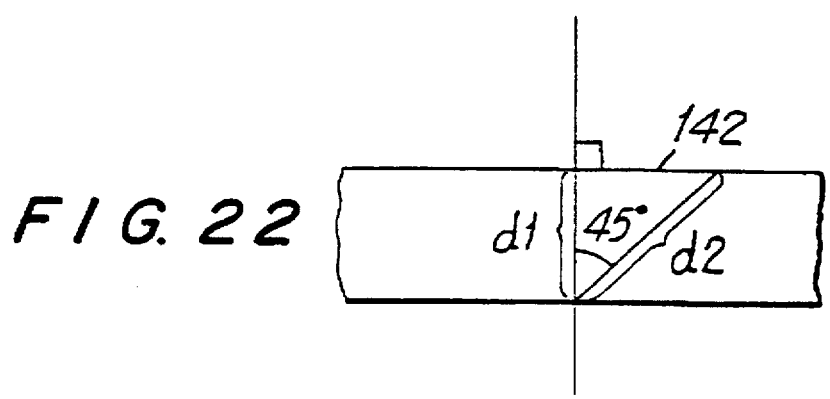
FIG. 22 is a fragmentary enlarged section of a phase difference plate showing the thickness d1 and d2 in accordance with the invention.

One variable in the experiment was the value K, defined as follows:

$K = \Delta n1 \cdot d1$ (vertical direction)/$\Delta n2 \cdot d2$(45° angle)

Where $\Delta n1$ is the optical anisotropy and d1 is the thickness, in the vertical direction of the phase difference plate, $\Delta n2$ is the optical anisotropy at a 45° angle in the direction of the optical axis of the phase difference plate and d2 is the thickness of the phase difference plate when inclined at 45° from the vertical direction of the phase difference plate in the direction of the optical axis. The thicknesses d1 and d2 are illustrated in FIG. 22. From experimentation, it was also found that when the value of K is smaller than 1.20 the direction of incident light in which a high reflectance is obtained is in the range from about +60° to about +150° with respect to the optical axis of the phase difference plate.

The panel conditions are shown in Table 5 below:

TABLE 5

| Panel No. | Twist Angle [°] | θ11 [°] | θ12 [°] | θ13 [°] | K [-] | Δn · d of panel [μm] |
|---|---|---|---|---|---|---|
| 1 | 180 | 45 | 45 | 0 | 1.37 | 0.85 |
| 2 | 230 | 70 | 20 | 25 | " | " |
| 3 | " | 85 | " | " | " | " |
| 4 | " | 50 | " | " | " | " |
| 5 | " | 70 | 5 | " | " | " |
| 6 | " | " | 35 | " | " | " |
| 7 | " | " | 20 | 40 | " | " |
| 8 | " | " | " | 10 | " | " |
| 9 | " | " | " | 25 | 1.14 | " |
| 10 | " | " | " | " | 1.19 | " |
| 11 | " | " | " | " | 1.20 | " |
| 12 | 270 | 90 | 0 | 45 | 1.37 | " |
| 13 | 230 | 70 | 20 | 25 | " | 0.75 |
| 14 | " | " | " | " | " | 0.92 |

Figure 16:
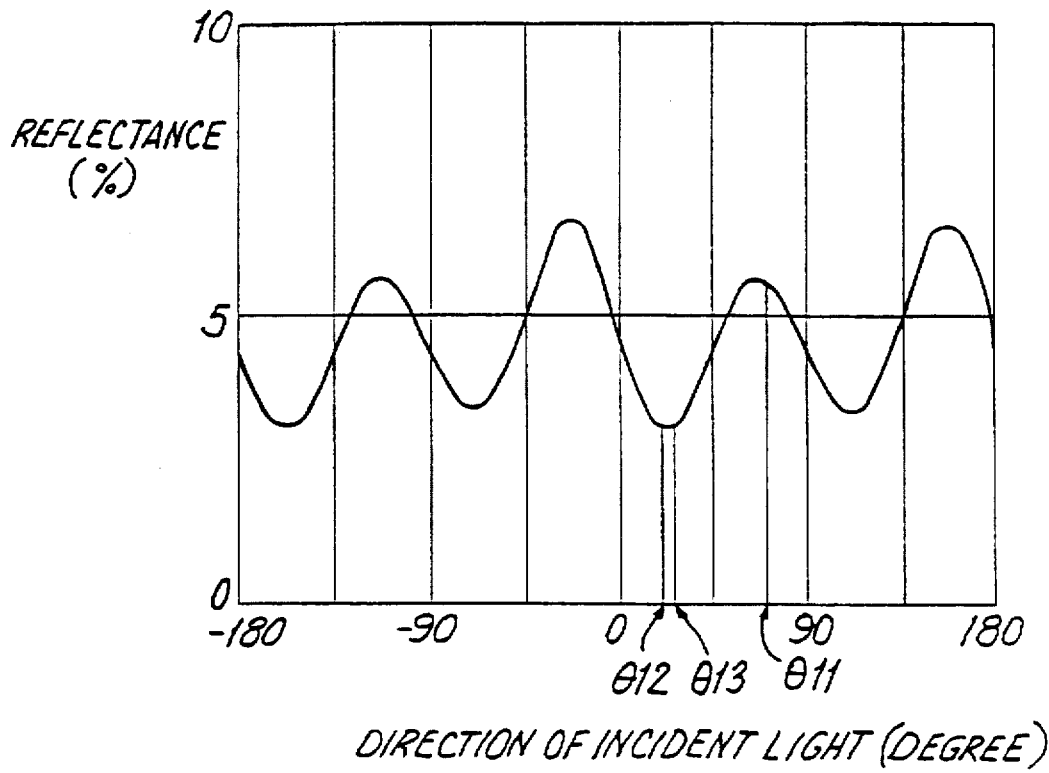
FIG. 16, 17, 18, 19, 20 and 21 are graphs showing the relationship between the direction of incident light and the reflectance in the embodiment of the present invention which includes a reflector.
Figure 17:
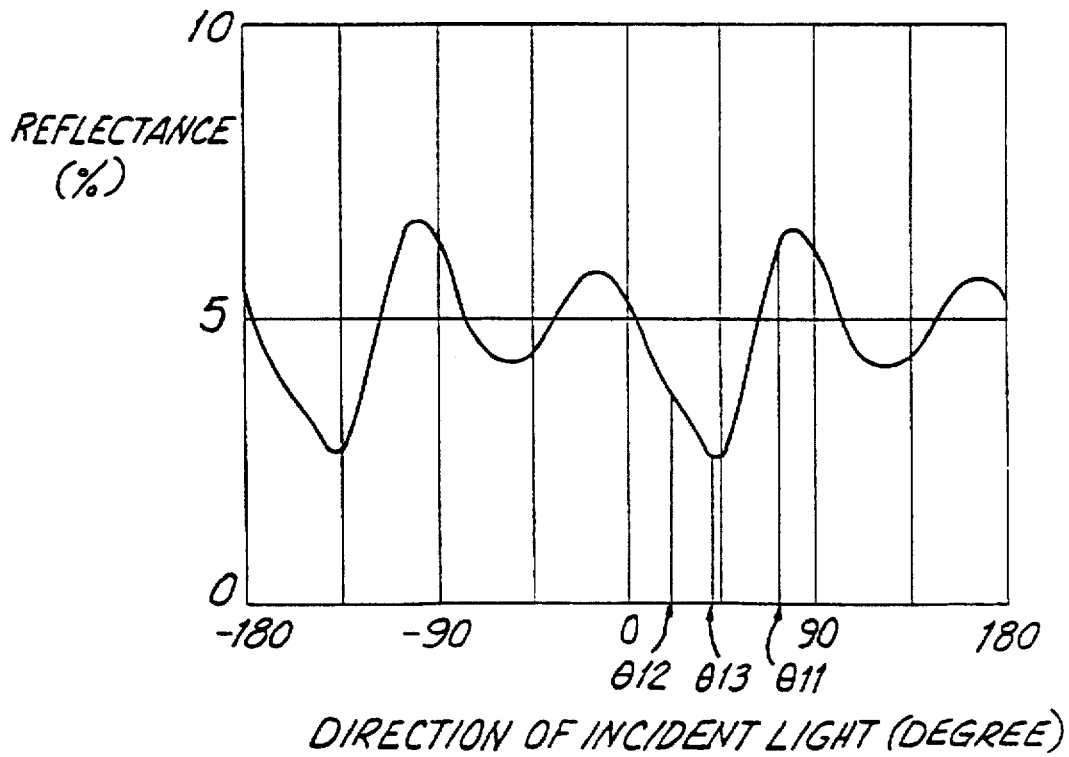
Figure 18:
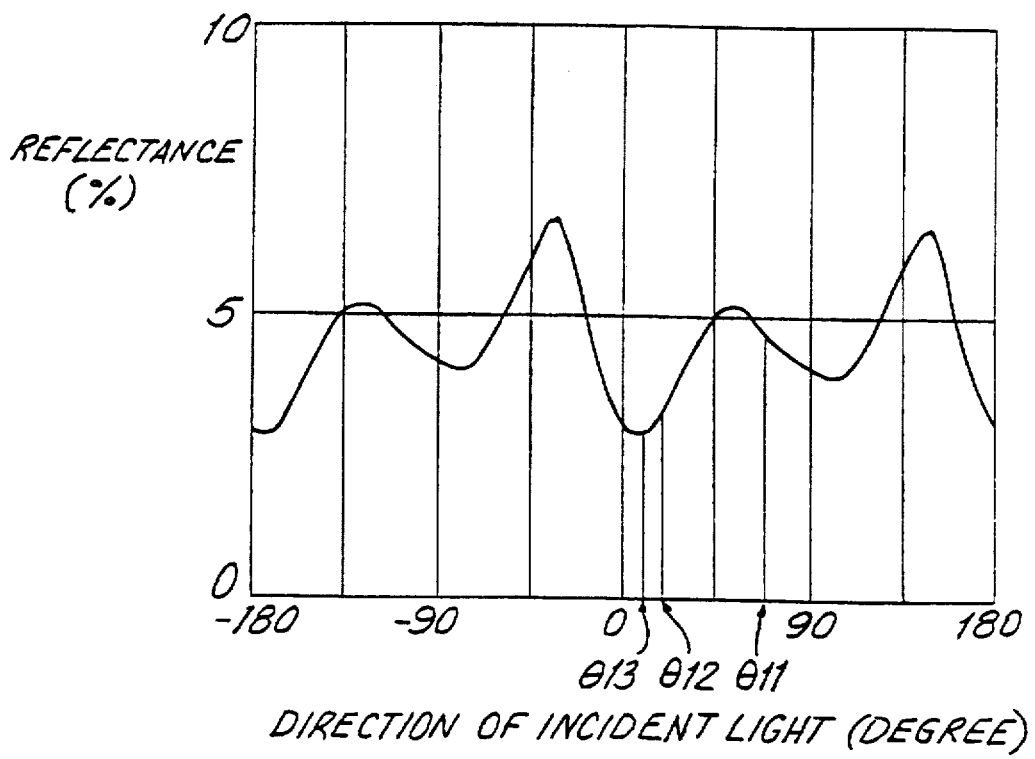

FIGS. 16 to 18 are graphs showing the relationship between the direction of the incident light and the reflectance obtained for panel Nos. 2, 7 and 8, respectively, in Table 5, that is in the case where K=1.37 and only the direction of the optical axis of the phase difference plate (θ13) was varied without changing the directions of absorption axis of the upper and lower polarizing plates. By examining these graphs, it is seen that the direction of the incident light in which a high reflectance (higher than about 5%) is obtained is related to the direction of the optical axis of the phase difference plate. A high reflectance is obtained for θ13 (the angle between the observation direction and the optical axis) in the range of from about +30° to about +60° and in the range of from about −30° to about −60°. In other words, it is possible to raise the reflectance and hence increase the brightness by setting the optical axis of the phase difference plate at an angle in the range of from about +30° to about +60° or in the range of from about −30° to about −60° with respect to the observation direction.

Figure 19:
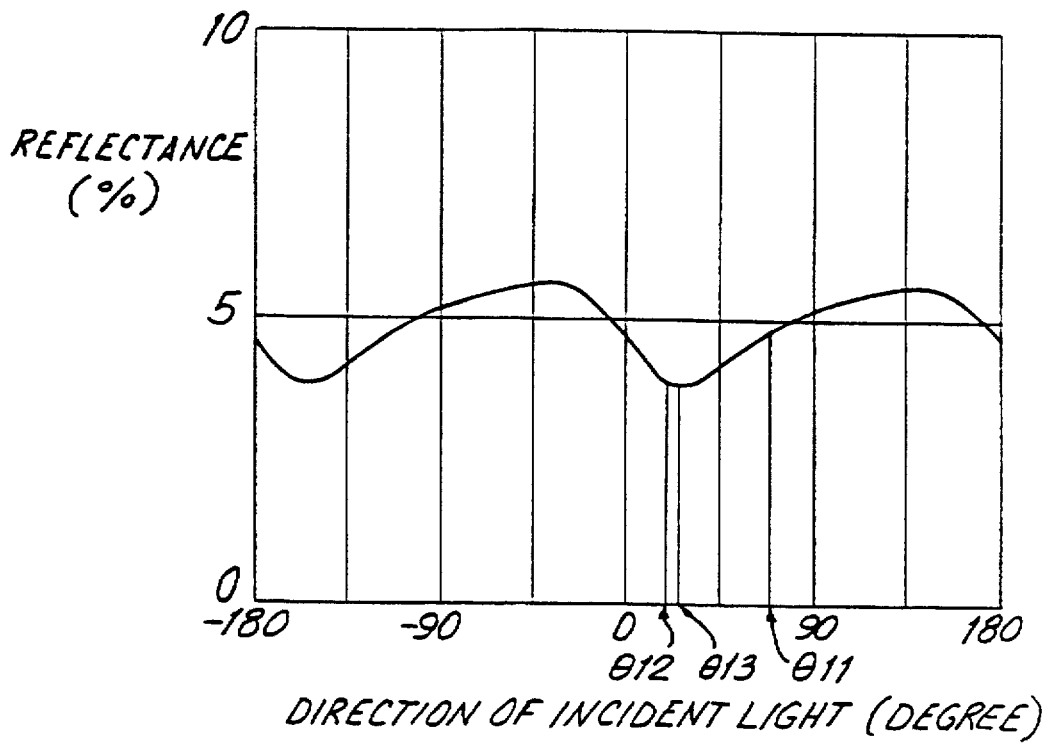
Figure 20:
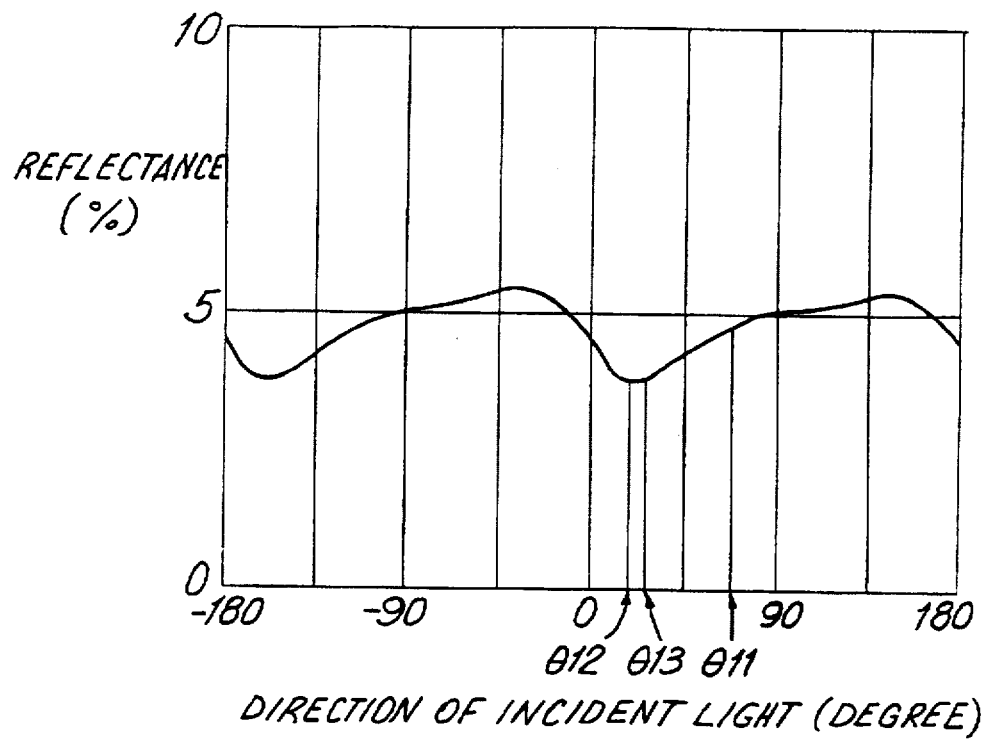
Figure 21:
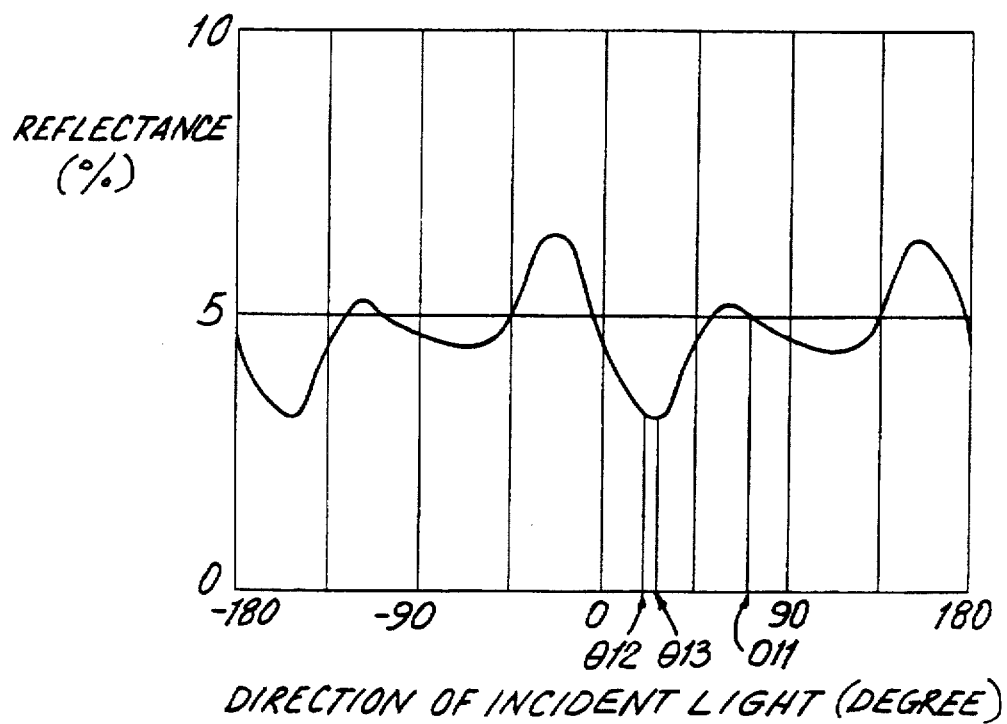

FIGS. 19, 20 and 21 are graphs showing the relationship between the direction of the incident light and the reflectance obtained for panels Nos. 9, 10 and 11, respectively, in Table 5, that is, in the case where the value of K was varied. It is understood from these graphs that the relationship between the direction of the incident light and the reflectance depends on whether or not the value of K is smaller than 1.20 and that when K is less than 1.20 the direction of the incident light in which a high reflectance is obtained is in the range of from about +60° to about +150° with respect to the optical axis. The brightness of the display can be increased by setting the optical axis of the phase difference plate at an angle θ13 in the range of from about +30° to about +120° with respect to the observation direction.

Similarly, the relationship between the direction of the incident light and the reflectance was obtained under the panel conditions shown in Table 5. Table 6 shows the ranges of incident light within which a high reflectance (higher than about 5%) is obtained.

TABLE 6

| Panel No. | Ranges of angle [°] of incident light to optical axis of phase difference plate within which high reflectance (higher than about 5%) is obtained | Ranges of angle [°] of optical axis of phase difference plate to observation direction within which high reflectance (higher than about 5%) is obtained |
|---|---|---|
| 1 | +30−+60, −30−−60 | +30−+60, −30−−60 |
| 2 | " | " |
| 3 | " | " |
| 4 | " | " |
| 5 | " | " |
| 6 | " | " |
| 7 | " | " |
| 8 | " | " |
| 9 | +60−+150 | +30−+120 |
| 10 | " | " |
| 11 | +30−+60, −30−−60 | +30−+60, −30−−60 |
| 12 | " | " |
| 13 | " | " |
| 14 | " | " |

The results shown in Tables 5 and 6 demonstrate that the relationship between the direction of the incident light and the reflectance does not depend on the absorption axes of the upper and lower polarizing plates, the twist angle or the value of Δn·d of the liquid crystal panel, but only on the direction of the optical axis of the phase difference plate and the value of K.

Therefore to improve the reflectance of the liquid crystal display having a reflector, and therefore the brightness, the direction of the optical axis of the phase difference plate is determined as follows:

1. When the value of K is 1.20 or more, the optical axis of the phase difference plate is disposed at an angle in the range of from about +30° to about +60° or in the range of from about −30° to about −60° with respect to the observation direction, where the values of the angles are positive when measured clockwise from the observation direction.

2. When the value of K is smaller than 1.20, the optical axis of the phase difference plate is disposed at an angle in the range of from about +30° to about 120° with respect to the observation direction, where the values of the angles are positive when measured clockwise from the observation direction.

Thus, the liquid crystal display device according to the present invention is arranged such that when the value of K of the phase difference plate is 1.20 or more, the optical axis of the phase difference plate is disposed at an angle in the range of from about +30° to about +60° or in the range of from about −30° to about −60° with respect to the observation direction, whereas, when the value of K is smaller than 1.20, the optical axis of the phase difference plate is disposed at an angle in the range of from about +30° to about +120° with respect to the observation direction, thus improving the brightness of the liquid crystal display device.

It will thus be seen that the objects set forth above, among those made apparent from the preceding description, are efficiently attained, and since certain changes may be made in the above articles without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method of driving a liquid crystal display device which includes a twisted nematic liquid crystal display cell defining a display screen having a rear edge as viewed from the user and including a pair of spaced apart opposed substrates with electrodes selectively disposed thereon and a nematic liquid crystal material disposed in the space between the substrates; a pair of polarizing plates disposed on opposite sides of the liquid crystal cell; at least one layer of an optically anisotropic substance disposed between said liquid crystal cell and one of said polarizing plates and serving as a phase difference plate; and a reflector disposed beneath the lower of the polarizing plates; the method comprising the steps of:

selecting the value of k less than 1.20, wherein the value of the ratio k is the ratio of the product $\Delta n1 \cdot d1$, where $\Delta n1$ is the optical anisotropy and $d1$ is the thickness in the vertical direction of said phase difference plate, to the product $\Delta n2 \cdot d2$, where $\Delta n2$ is the optical anisotropy and $d2$ is the thickness of said phase difference plate when inclined at 45° from the vertical direction of said phase difference plate in the direction of the optical axis;

setting the optical axis of said phase difference plate at a predetermined angle from about +30° to about +120° with respect to the observation direction, the observation direction being the direction of the projection in the plane of the display screen of the direction from which a user of said display screen most frequently views said display screen, where the values of these angles are positive when measured clockwise from the observation direction; and applying a voltage to said liquid crystal display device.

2. The method as claimed in claim 1, wherein said display mode is a negative display mode.

3. The method as claimed in claim 1, wherein said display mode is a positive display mode.

4. The method as claimed in claim 1, wherein the screen is dark when no voltage is applied and bright when a voltage is applied to the liquid crystal display device.

5. The method as claimed in claim 1, wherein the screen is bright when no voltage is applied and dark when a voltage is applied to the liquid crystal display device.

6. A liquid crystal display device, comprising:

a twisted nematic liquid crystal display cell including a pair of spaced apart opposed substrates with electrodes selectively disposed thereon and a twisted nematic liquid crystal material disposed in the space between the substrates;

a pair of polarizing plates disposed on opposite sides of the liquid crystal cell, one of which defines a display screen; and at least one layer of an optically anisotropic substance disposed between the liquid crystal cell and one of the pair of polarizing plates;

the display screen having a rear edge as viewed from a user and an observation direction which is both in the plane of the display screen and substantially perpendicular to the rear edge thereof, the observation direction being the direction of the projection in the plane of the display screen of the direction from which a user of said display device most frequently views said display screen, the device being constructed and arranged to have a viewing angle with respect to the observation direction at which the display will have acceptable contrast to accurately convey information to a user, the angle between the direction of the optical axis of the optically anisotropic substance layer and the observation direction of the display device being set at a predetermined angle to produce substantially bilateral symmetry of the contrast distribution with respect to the observation direction as the user moves in the direction of the viewing angle β between a projection of the direction of viewing by the user in the plane of the display screen and the observation direction or in the direction of the viewing angle α between the direction of viewing of the user and an axis perpendicular to the observation direction and the plane of the display screen; and means for applying a voltage to said liquid crystal display device.

7. A liquid crystal display device, comprising:

a twisted nematic liquid crystal display cell defining a display screen having a rear edge as viewed from the user and including a pair of spaced apart opposed substrates with electrodes selectively disposed thereon and a nematic liquid crystal material disposed in the space between the substrates;

a pair of polarizing plates disposed on opposite sides of the liquid crystal cell;

at least one layer of an optically, anisotropic substance disposed between said liquid crystal cell and one of said polarizing plates and serving as a phase difference plate;

a reflector disposed beneath the lower of the polarizing plates, wherein the value of the ratio K of the product $\Delta n1 \cdot d1$, where $\Delta n1$ is the optical anisotropy and $d1$ is the thickness in the vertical direction of said phase difference plate, to the product $\Delta n2 \cdot d2$, wherein $\Delta n2$ is the optical anisotropy and $d2$ is the thickness of said phase difference plane when inclined at 45° from the vertical direction of said phase difference plate in the direction of the optical axis, is set at a predetermined level, and the optical axis of said phase difference plane is disposed at a predetermined angle with respect to the observation direction, said observation direction being both in the plane of the display screen and substantially perpendicular to the rear edge thereof, the observation direction being the direction of the projection in the plane of the display screen of the direction from which a user of said display device most frequently views said display screen, said predetermined angle being chosen in relation to said predetermined level of K such that the reflectance of said display is substantially maximized; and means for applying a voltage to said liquid crystal display device;

wherein the value of K is greater than or equal to 1.20 and the predetermined angle at which the optical axis of said phase difference plane is disposed with respect to the observation direction is in the range from about +30° to about +60° or in the range from about −30° to about −60°, wherein the values of these angles are positive when measured clockwise from the observation direction.

8. A liquid crystal display device, comprising:

a twisted nematic liquid crystal display cell defining a display screen having a rear edge as viewed from the user and including a pair of spaced apart opposed substrates with electrodes selectively disposed thereon and a nematic liquid crystal material disposed in the space between the substrates;

a pair of polarizing plates disposed on opposite sides of a liquid crystal cell;

at least one layer of an optically anisotropic substance disposed between said liquid crystal cell and one of said polarizing plates and serving as a phase difference plate;

a reflector disposed beneath the lower of the polarizing plates, wherein the value of the ratio K of the product $\Delta n1 \cdot d1$, where $\Delta n1$ is the optical anisotropy and d1 is the thickness in the vertical direction of said phase difference plate, to the product $\Delta n2 \cdot d2$, wherein $\Delta n2$ is the optical anisotropy and d2 is the thickness of said phase difference plane when inclined at 45° from the vertical direction of said phase difference plate in the direction of the optical axis, is set at a predetermined level, and the optical axis of said phase difference plane is disposed at a predetermined angle with respect to the observation direction, said observation direction being both in the plane of the display screen and substantially perpendicular to the rear edge thereof, the observation direction being the direction of the projection in the plane of the display screen of the direction from which a user of said display device most frequently views said display screen, said predetermined angle being chosen in relation to said predetermined level of K such that the reflectance of said display is substantially maximized;

means for applying a voltage to said liquid crystal display device; and wherein the value of K is less than 1.20 and the predetermined angle at which the optical axis of said phase difference plane is disposed with respect to the observation direction is from about +30° to about +120°, where the values of these angles are positive when measured clockwise form the observation direction.

\* \* \* \* \*